United States Patent
Fan

(10) Patent No.: US 10,737,738 B2
(45) Date of Patent: Aug. 11, 2020

(54) SCOOTER

(71) Applicant: HL Corp (Shenzhen), Shenzhen (CN)

(72) Inventor: Cheng-Neng Fan, Shenzhen (CN)

(73) Assignee: HL CORP (SHENZHEN), Shenzhen (CN)

( * ) Notice: Subject to any disclaimer, the term of this patent is extended or adjusted under 35 U.S.C. 154(b) by 35 days.

(21) Appl. No.: 15/552,831

(22) PCT Filed: Dec. 24, 2015

(86) PCT No.: PCT/CN2015/098784
§ 371 (c)(1),
(2) Date: Aug. 23, 2017

(87) PCT Pub. No.: WO2016/101906
PCT Pub. Date: Jun. 30, 2016

(65) Prior Publication Data
US 2018/0057095 A1 Mar. 1, 2018

(30) Foreign Application Priority Data
Dec. 24, 2014 (CN) ..................... 2014 2 0830378 U

(51) Int. Cl.
*B62K 3/00* (2006.01)
*B62K 5/02* (2013.01)
*B62M 1/12* (2006.01)

(52) U.S. Cl.
CPC ............... *B62K 3/002* (2013.01); *B62K 5/02* (2013.01); *B62M 1/12* (2013.01)

(58) Field of Classification Search
CPC . B60K 5/10; B60K 3/002; B60K 5/02; B60K 5/06
See application file for complete search history.

(56) References Cited

U.S. PATENT DOCUMENTS

| 4,065,146 A * 12/1977 | Denzer | B62K 3/002 280/221 |
|---|---|---|
| 4,088,338 A * 5/1978 | Winchell | B62K 3/002 280/220 |

(Continued)

FOREIGN PATENT DOCUMENTS

| CN | 201376635 Y | 1/2010 |
|---|---|---|
| CN | 204527443 U | 8/2015 |
| WO | WO 2009078634 A2 | 6/2009 |

OTHER PUBLICATIONS

International Publication for PCT/CN2015/098784.
International Search Report for PCT/CN2015/098784.

*Primary Examiner* — Hau V Phan

(57) ABSTRACT

A scooter (5) includes a head tube (50); a riser tube (51) freely and rotatably pivoted with the head tube (50), the upper end of the riser tube being provided with a handle (511); a preceding runner (52) provided at the lower end of the riser tube (51); a left carrier (53) and a right carrier (53) both connected to the head tube (50); a left back runner (54) and a right back runner (54) provided at the left carrier (53) and the right carrier (53) respectively, which support the scooter (5) alone with the preceding runner (52); the front end of each carrier (53) is provided with a cantilever (533) respectively. The left cantilever (533) and the right cantilever (533) are both provided at the head tube (50) in a suspending form of swinging back and forth freely. Provided between the left cantilever, the right cantilever (533) and the head tube (50) is a holding means (55) enabling the left carrier and the right carrier to perform back and forth alternate swing and displacement action. The scooter (5) is provided with the holding means (55) between the left cantilever, the right cantilever, and the head tube (50). When two feet of the user exert force on the corresponding carrier alternately or two hands exert force on the handle alternately (Continued)

to drive the head tube (50) to swing left and right, by means of the effect of the holding means (55), the left cantilever (533) and the right cantilever (533) will swing back and forth alternately on the head tube (50) and then drives the left carrier (53) and the right carrier (53) to perform alternate back and forth displacement action together, so that the traveling and handling of the scooter (5) is smoother, faster and more labor-saving.

20 Claims, 24 Drawing Sheets

(56) References Cited

U.S. PATENT DOCUMENTS

| | | | | |
|---|---|---|---|---|
| 6,485,039 B1 * | 11/2002 | Ming-Fu | ............... | B62K 3/002 280/282 |
| 6,554,302 B1 * | 4/2003 | Liu | ............... | B60T 1/04 280/220 |
| 6,719,310 B1 * | 4/2004 | Lin | ............... | B62K 3/002 280/62 |
| 6,880,840 B2 * | 4/2005 | Chuang | ............... | B62K 3/002 280/62 |
| 6,883,814 B2 * | 4/2005 | Chuang | ............... | B62K 3/002 280/62 |
| 6,908,090 B2 * | 6/2005 | Chuang | ............... | B62K 3/002 280/62 |
| 7,549,655 B2 * | 6/2009 | Fan | ............... | B62K 3/002 280/87.041 |
| 8,205,895 B2 * | 6/2012 | Chen | ............... | B62K 3/002 280/87.01 |
| 8,328,209 B2 * | 12/2012 | Tsai | ............... | B62K 15/008 280/87.042 |
| 8,505,945 B2 * | 8/2013 | Chen | ............... | B62K 5/10 280/220 |
| 2002/0050695 A1 * | 5/2002 | Feng | ............... | B62K 3/002 280/87.041 |
| 2002/0063406 A1 * | 5/2002 | Feng | ............... | B62K 3/002 280/87.041 |
| 2007/0096410 A1 * | 5/2007 | Spencer | ............... | B62B 13/12 280/14.21 |
| 2010/0201096 A1 | 8/2010 | Fan | | |
| 2014/0070508 A1 * | 3/2014 | Yamabe | ............... | A63C 17/006 280/87.041 |
| 2014/0117641 A1 * | 5/2014 | Fan | ............... | B62K 3/002 280/228 |

* cited by examiner

SCOOTER

TECHNICAL FIELD

The present disclosure relates to fitness and sports equipment, and more particularly to a scooter.

DESCRIPTION OF RELATED ART

A conventional scooter, which is triangular and can be driven by swing handle on left and right, for example, in U.S. Pat. Nos. 6,499,751 B1, 6,517,093 B2, 6,554,302B1, U.S. Pat. No. 6,827,358 B2, U.S. Pat. No. 6,976,687 B2, and etc. . . . Structures of most of these conventional scooters are similar to scooters shown in FIG. 1 and FIG. 2. In FIG. 1 and FIG. 2, each scooter is provided with a front pipe 10, a free-riser 11 pivoting arranged on the front pipe 10, handles 12 arranged on an upper end of the free-riser 11, a front wheel 13 arranged on a lower end of the free-riser 11 by a front fork 111. A hinge 101 is arranged on front of a lower end of the front pipe 10. A locked end 202 locks extension sections 201 of left and right carrier rods 20 by a bolt 102 and a lining component 103. A first through shaft 104 is arranged on the front pipe 10 corresponding to a rear end of the hinge 101 for a pivotal movement of a rotary block 14. Two second through shafts 141 are respectively and transversely arranged on two rear ends of the rotary block 14, for passing through left and right cushioning elastic bodies 15, and for locking the left and right cushioning elastic bodies 15 by a bolt 142 and a lining component 143. The left and right cushioning are accommodated in bushings 203 on front ends of left and right carrier rods 20. Rear wheels 21 and carriers 22 are respectively arranged on rear ends of the left and right carrier rods 20. With these structures, when the user is standing on left and right carriers 22 and is swung the handle 12 on right and left, the front pipe 10 will swing left and right together, so that the flout end of the left and right carrier rods 20 can swing up and down at the turning point around the bolt 102, the rotary block 14 can be rotated around the first through shaft 104, the second through shafts 141 can swing up and down and can press the cushioning elastic body 15, the left and right carrier rods 20 will have a cushioning and resetting force, and left and right handles 12 will cause the front wheel 13 swing on left and right and rolling on a S-path, therefore, the scooter can slide forward.

It is undeniable that the above-mentioned scooter does provide a good sport and fitness effect for the user; however, there are still deficiencies in the implementation:

First, when the handles 12 are swung on left and right, the front end of the left and right carrier rods 20 are swung up and down around the bolt 102, and the cushioning elastic body 15 in the adjacent front end of the sleeve 203 is passed through by the second through shafts 141 at both two ends of the rotary block 14 and has a function of fixing, cushioning and resetting, thus the movement of the front end of the left and right carrier rods 20 will be restricted, and the user will only be able to move the handles 12 to drive the scooter, and these can not fully use the interactive force mode of swinging body and feet, accordingly, will produce a more rigid, unnatural and not smooth phenomenon, on controlling the scooter.

Second, when the scooter is sliding, the front ends of the left and right carrier rods 20 are moved up and down around the bolt 102, and the front wheel 13 is swing on left and right, by swinging the handles 12. However, it has been necessary to constantly swing the handles 12 and feet of user can not actively interact on the carrier 22 and the rear wheels 21 to drive the scooter, and it is clear that the operation is laborious, monotonically or even uneven and stiff feeling.

Third, for the two rear wheels 21 can not be implemented by the interaction force action of the feet, the scooter has a prone of a vacant vacancy risk when sliding in a corner.

SUMMARY

The technical problem to be solved by the invention is to provide a scooter which can make the operation of the scooter smoother, quick, laborious and safe, and has unique operating modes and interesting and changing effects.

In order to solve the above technical problems, the present disclosure provides the following technical solutions: a scooter comprising:

front pipe;

riser, free rotatably pivoted on the front pipe, handles being, arranged on upper end of the riser;

front wheel, arranged on lower end of the riser;

left and right carriers, connected to the front pipe;

left and right rear wheels, respectively mounted on the left and right carriers, to support the scooter with the front wheel;

wherein cantilevers are respectively positioned on the left and right carriers, and the left and right cantilevers are mounted on the front pipe in a suspension form and are free to swing forward and backward, the left and right cantilevers and the front pipe are connected with each other by a holding device, which provide the left and right carriers to swing forward and backward and to displace.

According to the disclosure, the disclosure has the following advantages: a holding device is arranged between the left and right cantilevers and the front pipe, when the user's feet stand on the left and right carriers or the user's hands operate the handles to swing the front pipe, due to functions of the holding device, the left and right cantilevers can be swung alternately forward and backward, and the carriers are alternately replace on forward and backward, thus the scooter can be driven with more smoother, faster, effortless and full of changes and interesting.

DETAILED DESCRIPTION

Figure 1:
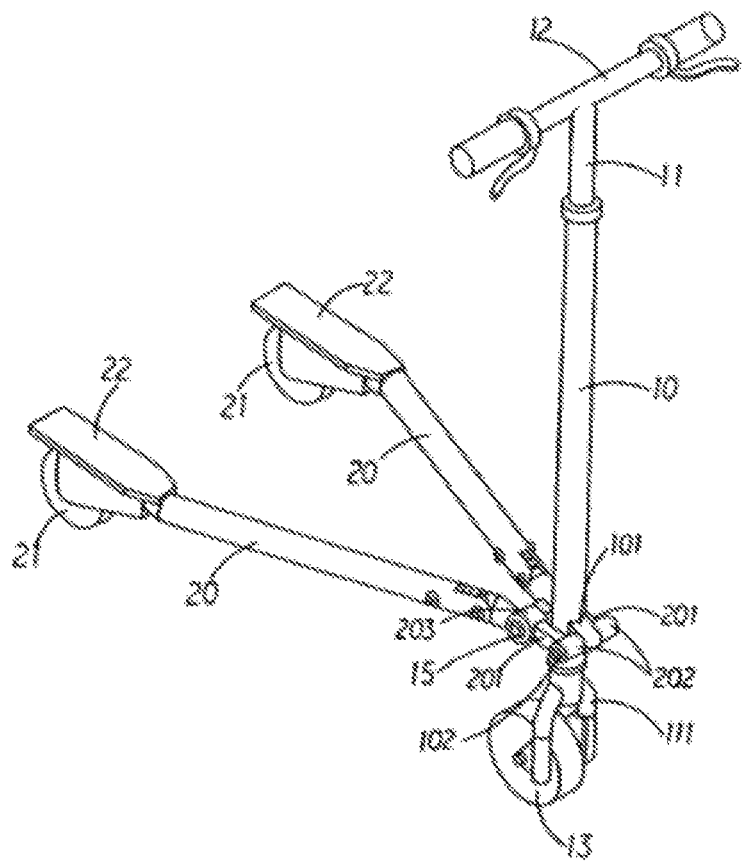
FIG. 1 is a schematic view of a conventional scooter.
Figure 2:
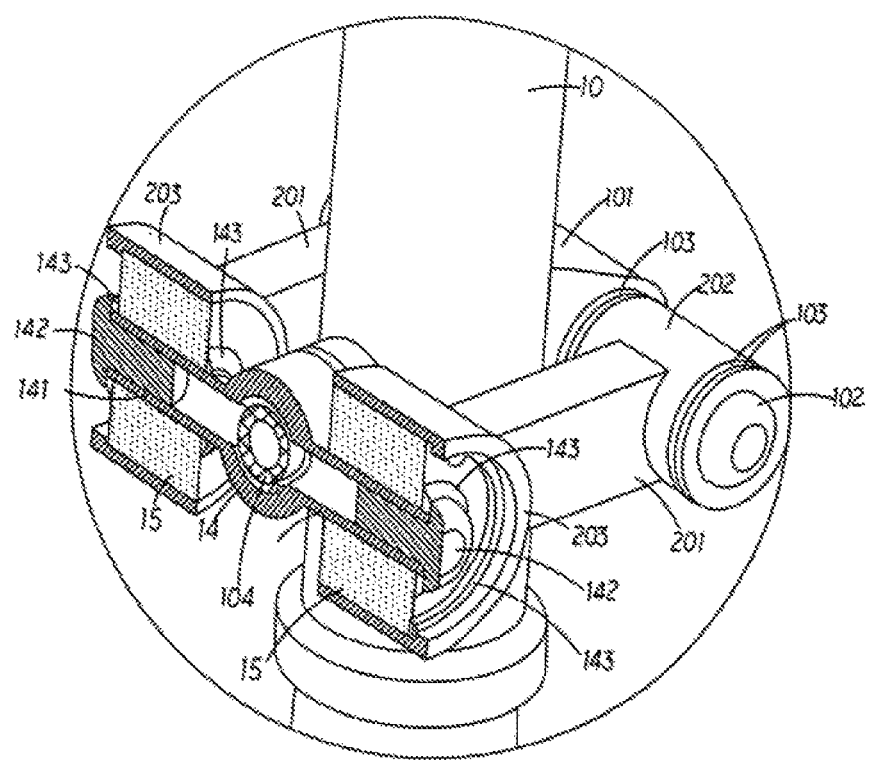
FIG. 2 is a partial configuration diagram of FIG. 1.
Figure 3:
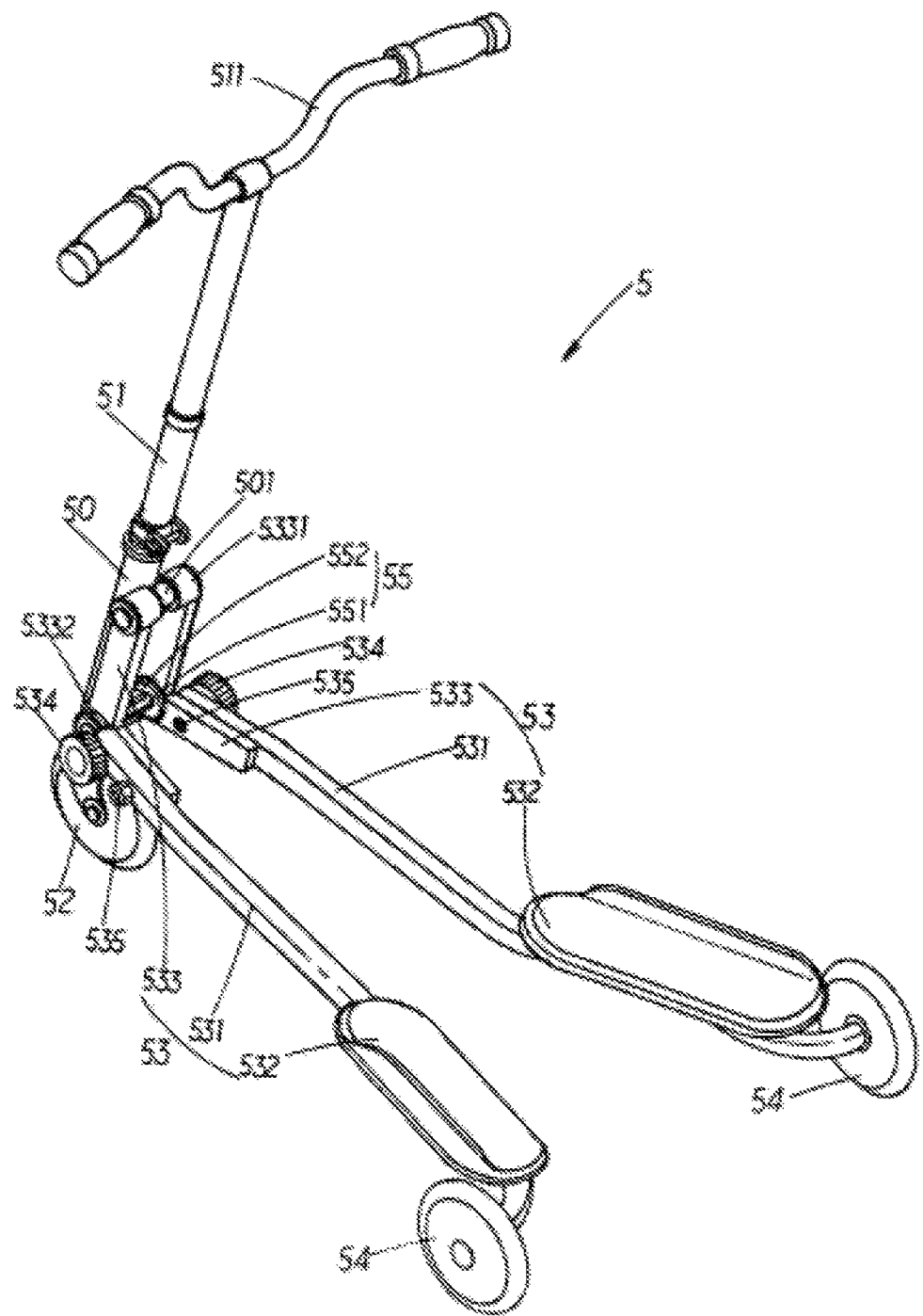
FIG. 3 is a schematic perspective view of a first embodiment of the present disclosure.
Figure 4:
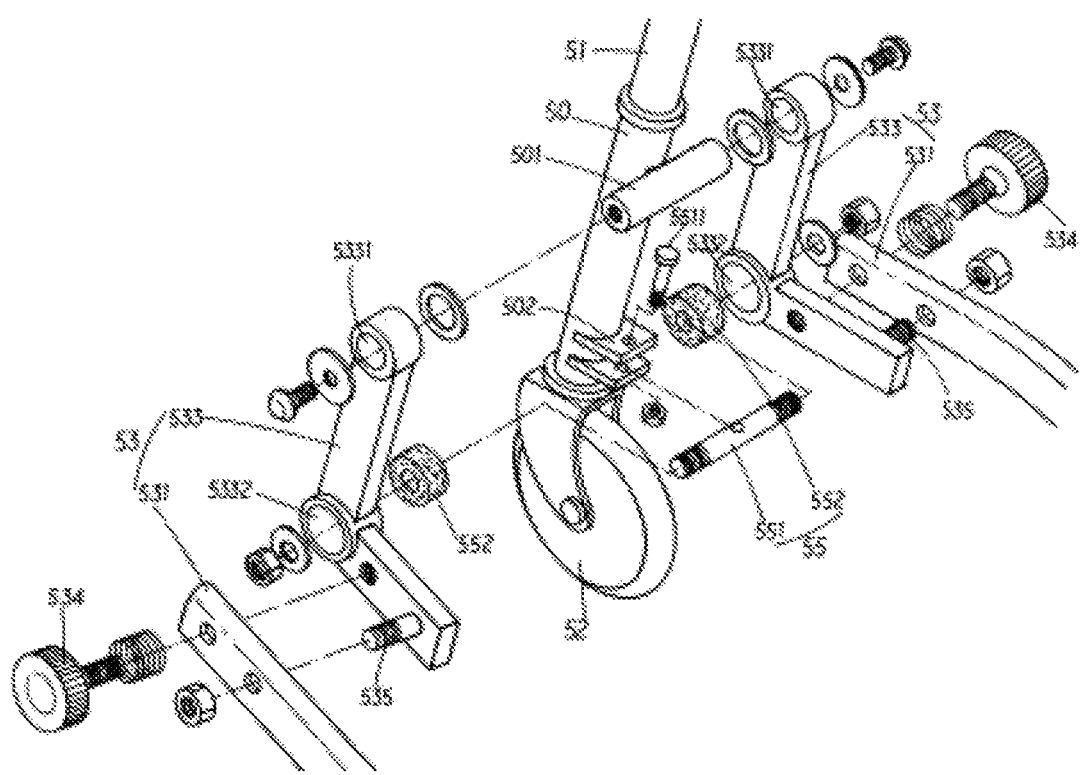
FIG. 4 is an exploded view of a portion of the structure of FIG. 3.
Figure 5:
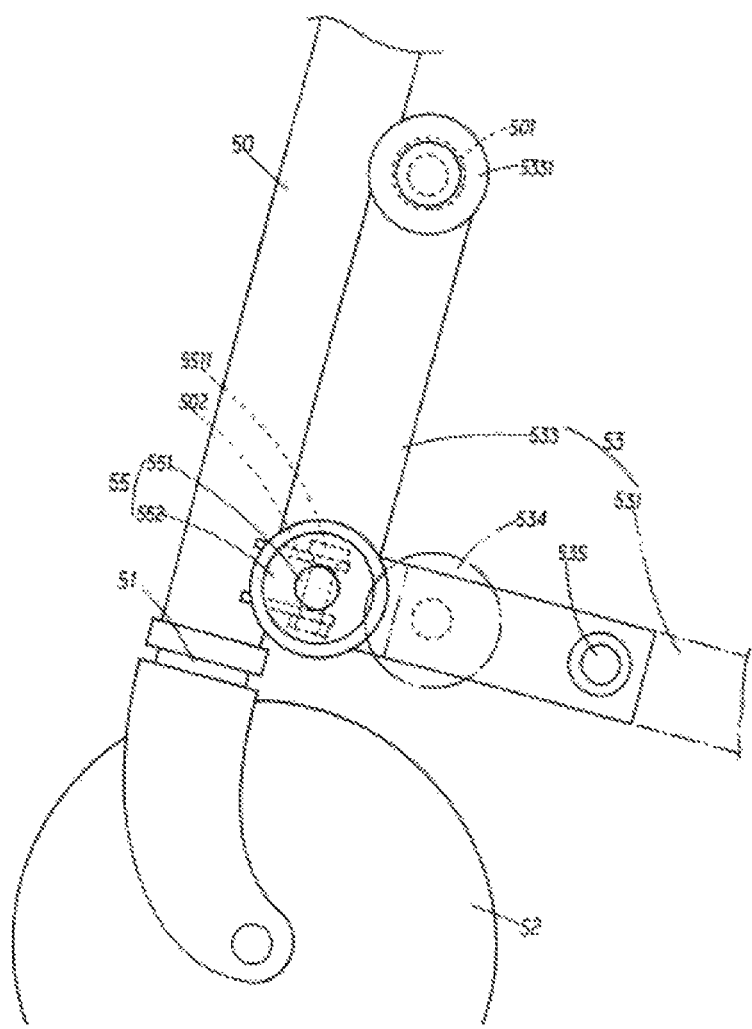
FIG. 5 is a schematic side view of a portion of the structure of FIG. 3.
Figure 6:
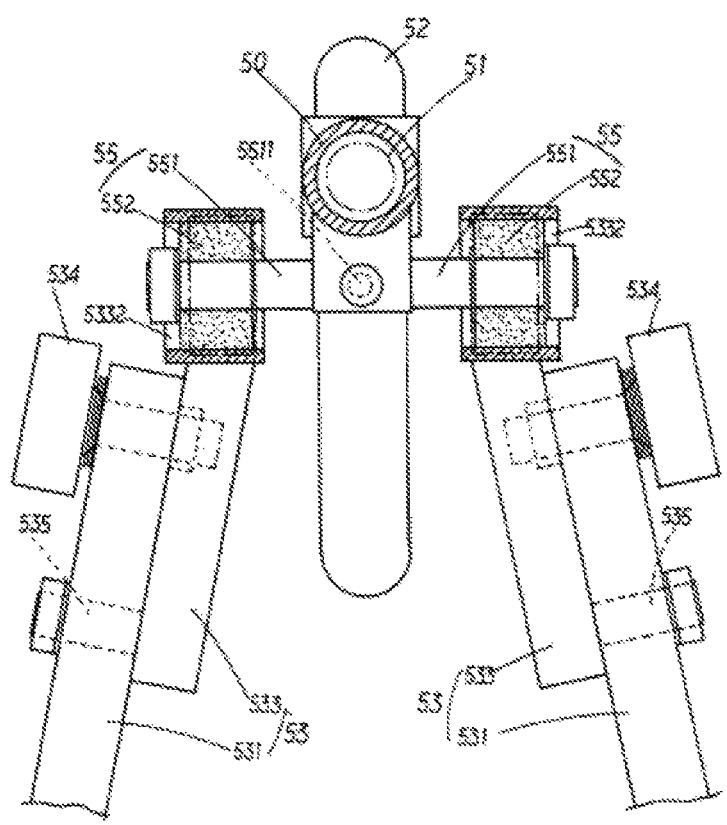
FIG. 6 is a schematic top view of a portion of the structure of FIG. 3.

It is to be noted that the features of the embodiments and examples in this application may be combined with each other without conflict, and the present application will be described in further detail below with reference to the accompanying drawings and specific examples.

FIGS. 3 to 6 show a first embodiment of the present disclosure, which provides a scooter 5. The scooter 5 includes a front pipe 50; a riser 51 which is free rotatably pivoted on the front pipe 50; handles 511 arranged on upper end of the riser 51; a front wheel 52 arranged on lower end of the riser 51; left and right carriers 53 connecting to the front pipe 50, each of the left and right canters 53 includes a carrier rod 531 and a pedal 532; left and right rear wheels 54 respectively mounted on the left and right carriers 53 to support the scooter 5 in cooperation with the front wheel 52.

Wherein left and tight cantilevers 533 are respectively positioned on front ends of the left and right carriers 53, and the left and right cantilevers 533 are mounted in the front pipe 50 in a suspension form and are free to swing forward and backward, respectively. Sleeves 5331 are arranged on the front pipe 50, and a first pivot shaft 501 is passing through the sleeves 5331. One end of each sleeve 5331 is connected to one corresponding carrier rod 531. The left and right cantilevers 533 and the front pipe 50 are connected with each other by an holding device 55, to provide buffering, resetting, limiting and guiding effections to the left and right cantilevers 533, thereby the left and right carriers 53 are able to swing forward and backward. The holding device 55 includes a connecting rod 551, and, left and right cushioning bodies 552. The connecting rod 551 is pivoted on a positioning supporter 502, which is positioned on the front pipe 50, and can swing forward and backward through a pivot 5511. The left and right cushioning bodies 552 are respectively inserted on sleeve holes 5332 predefined in corresponding cantilevers 533. The left and right cushioning bodies 552 are passed through by outer end of the connecting rod 551.

The connecting rod 551 of the holding device 55 may be provided as a single one, and about a middle portion is pivoted on the positioning supporter 502 of the front pipe 50 by the pivot 5511. Two ends of the connecting rod 551 may be respectively inserted on the cushioning bodies 552 of corresponding cantilevers 533. Or, there may have a left connecting rod 551 and a right connecting rod 551. Inner end of each connecting rod 551 may be pivoted on the positioning supporter 502 of the front pipe 50 by a pivot. Outer end of each connecting rod 551 may be respectively inserted on the cushion body 552 of corresponding cantilevers 533.

The holding device 55 can be cushioning elastic body or flexible body, such as spring or gifted rubber or the like, and one end of the cushioning elastic body or the flexible body is positioned on the front pipe 50 and the other end thereof is positioned on corresponding one of the left and right cantilevers 533.

The left and right cantilevers 533 may be integrated with corresponding carrier 53 or may be secured to corresponding carrier rod 531 by bolts 534, 535.

Figure 7:
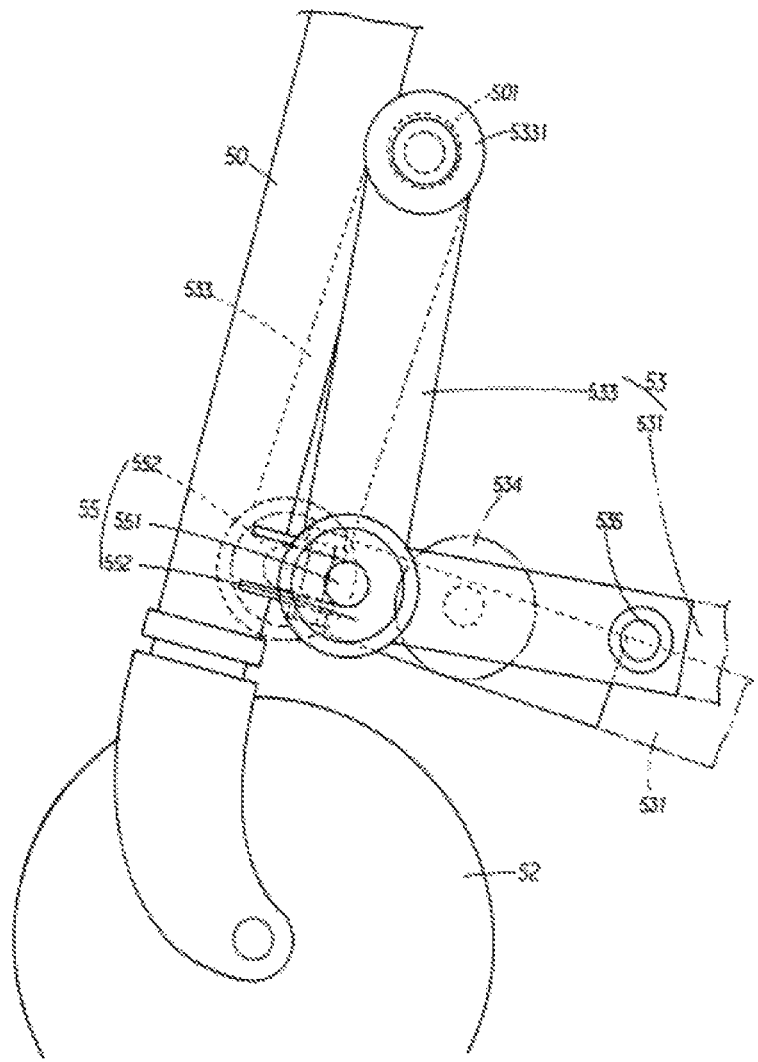
FIG. 7 is a schematic side view of a portion of the structure of FIG. 3 according to a use state.
Figure 8:
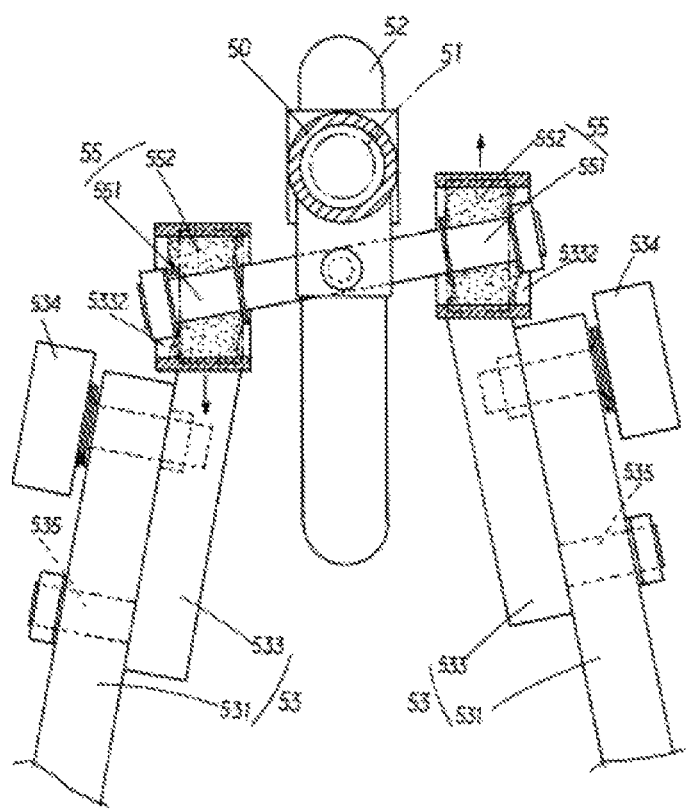
FIG. 8 is a schematic top view of a portion of the structure of FIG. 3 according to a use state.
Figure 9:
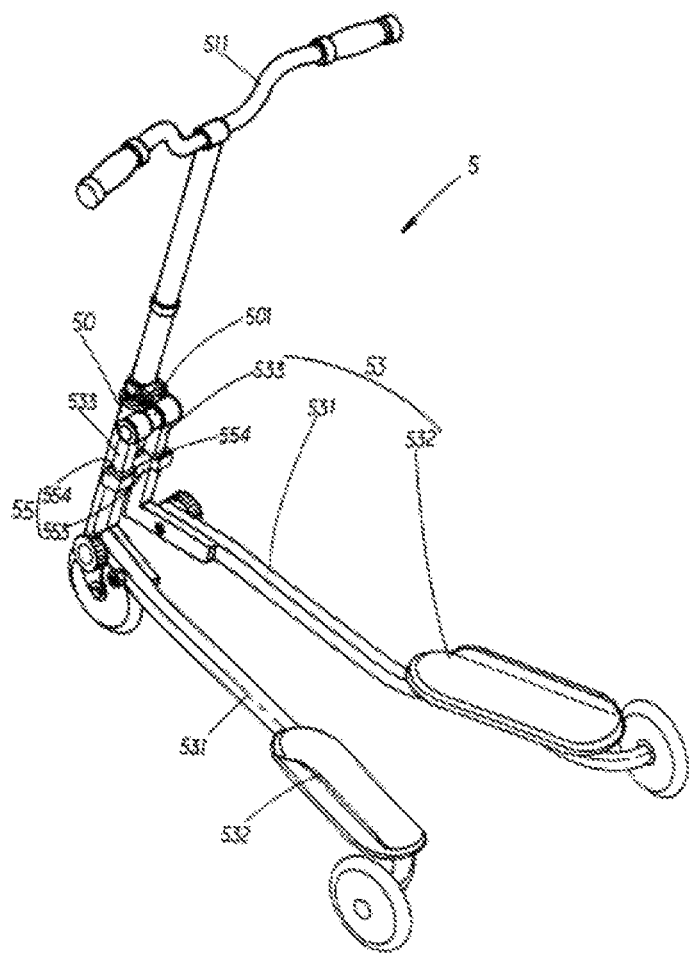
FIG. 9 is a schematic perspective view of a second embodiment of the present disclosure.
Figure 10:
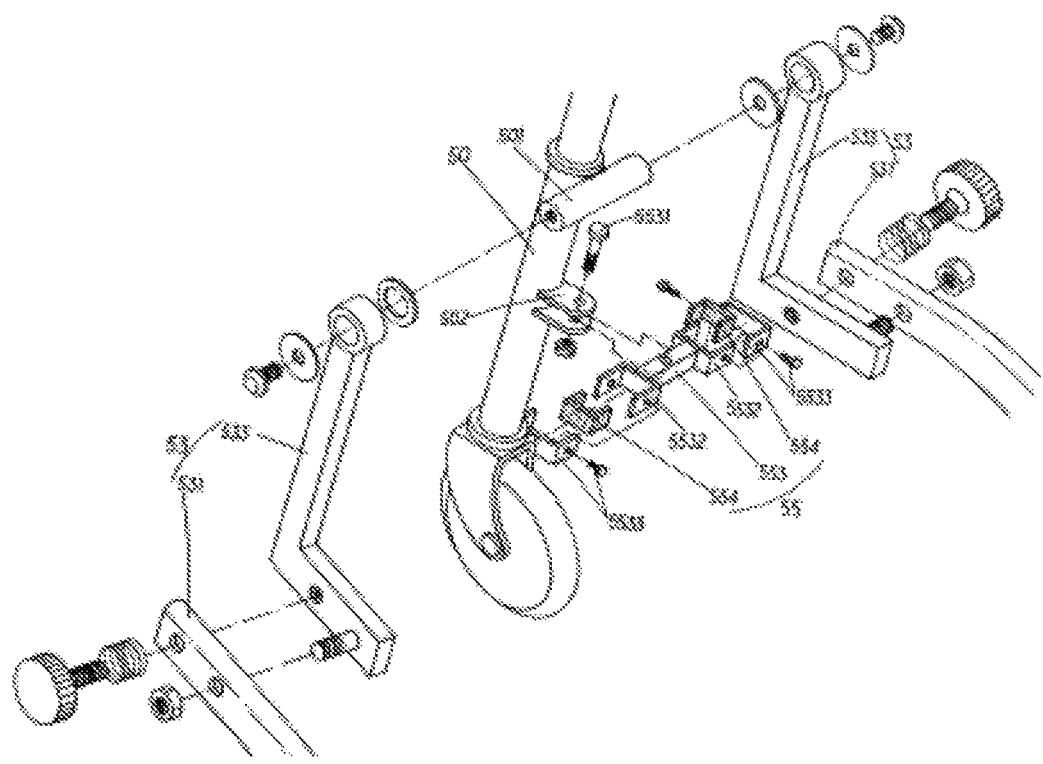
FIG. 10 is an exploded view of a portion of the structure of FIG. 9.
Figure 11:
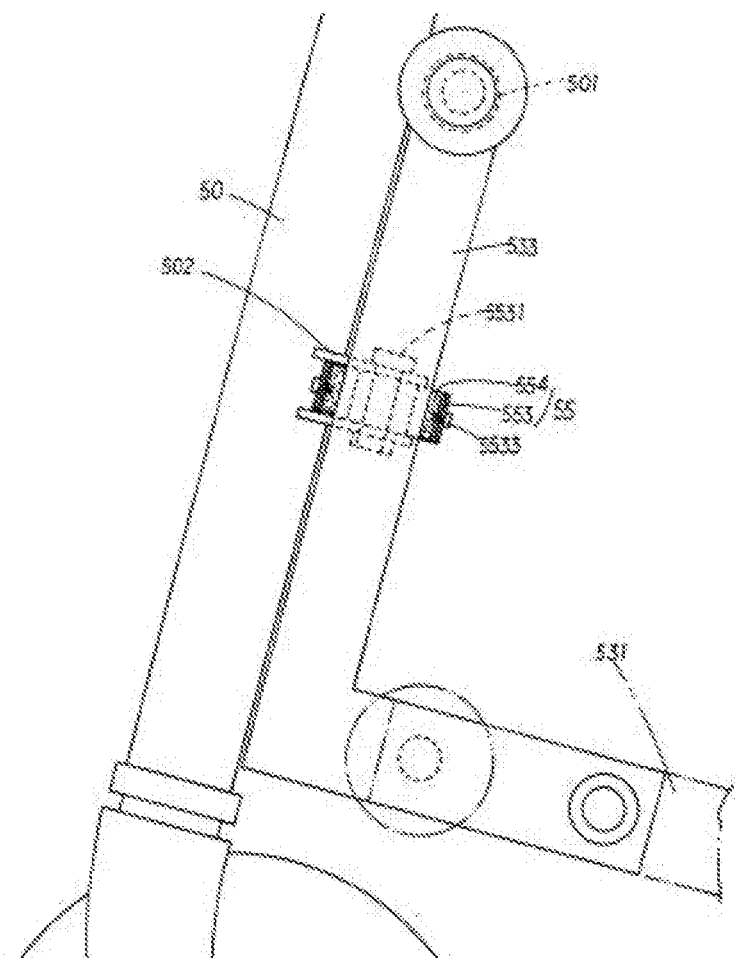
FIG. 11 is a schematic side view of a portion of the structure of FIG. 9.
Figure 12:
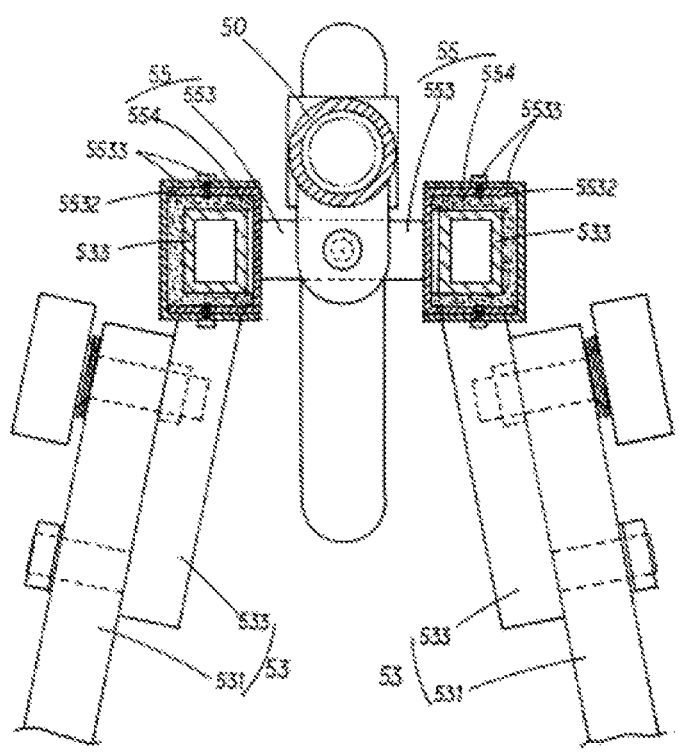
FIG. 12 is a schematic top view of a portion of the structure of FIG. 9.

As shown in FIGS. 7 and 8, for the scooter in the present disclosure employ the above-described structure, and since the left and right cantilevers 533 on the front end of the left and right carriers 53 is positioned on the front pipe 50 in a suspension form and are flee to swing forward and backward, and the left and right cantilevers 533 and the front pipe 50 are connected with each other by the holding device 55, it can provide buffering, resetting, limiting and guiding effections to the left and right carriers 53. When the user stand on the left and right carriers 53 and the user's hands operate the handles 511, if user alternately presses the right and left hands to swing the handle 511, the riser 51 and the front pipe 50 will be biased on left and right, or if user alternately presses the right and the left feet on the left and right carriers 53, or if user twists his body to swing the whole scooter, the left and right cantilevers 533 suspended on the front pipe 50 will be swung alternately forward and backward around the first pivot shaft 501, and that will cause the left and right carriers 53 to be coupled with the left and right cantilevers 533 and to force corresponding rear wheels 54, and the left and right rear wheels 54 can alternately roll forward, and the front wheel 52 will swing on right and left along with the handle 511*l* and will roll forward along a S-shaped path, to smoothly and fastably drive the scooter to move.

When the scooter is operated to go forward, since the left and right carriers 53 can automatically and alternately swing forward and backward to displace, thus, when the user stands on the left and right carriers 53, feet of user may follow the left and right carriers 53 to alternately press on the left and right rear wheels 54, which is effortless. And, with bias movement of feet, and, swinging action forward and backward and displace action of the left and right carriers 53, the scooter can have unique operations and may have movement patterns like skiing, that can achieve changeable and interesting effections.

Of course, since the left and right carriers 53 can be biased by the feet, the scooter can naturally reduce the chance of a round-off phenomenon, and that can achieve an improvement in security.

FIGS. 9 to 12 show a second embodiment of the present disclosure for a scooter. A structure of the scooter 5 in the present embodiment is similar to that of the first embodiment, the left and right carriers 53 are respectively mounted on the pivot shaft 501, which is positioned on the front pipe 50, in a suspension form and are free to swing forward and backward through the left and right cantilevers 533. But, the holding device 55, connected between the left and right cantilevers 533 and the front pipe 50, includes a connecting rod 553 and left and right cushioning bodies 554. The connecting rod 553 is pivoted on a positioning supporter 502, which is positioned on the front pipe 50, and can swing forward and backward through a pivot 5511. The left and right cushioning bodies 554 respectively cover outer circumference of the left and tight cantilevers 533 and are respectively fixed by outer end of the connecting rod 553.

The connecting rod 553 of the holding device 55 may be provided as a single one, and a middle portion may be pivotally mounted on the positioning supporter 502 of the front pipe 50 by the pivot. Two ends of each connecting rod 553 have buckle ears 5532. The buckle ears 5532 can respectively position the he left and right cushioning bodies 554, which covers outer circumference of the left and right cantilevers 533, by locking components 5533.

The connecting rod 554 the holding device 55 may be provided as a left one and a right one. Inner end of each connecting rod 553 may be pivotally mounted on the positioning supporter 502 of the front pipe 50 by a pivot. Outer end of each connecting rod 553 has buckle ear 5532. The buckle ears 5532 can respectively position the left and right cushioning bodies 554, which covers outer circumference of the left and right cantilevers 533, by locking component 5533.

Figure 13:
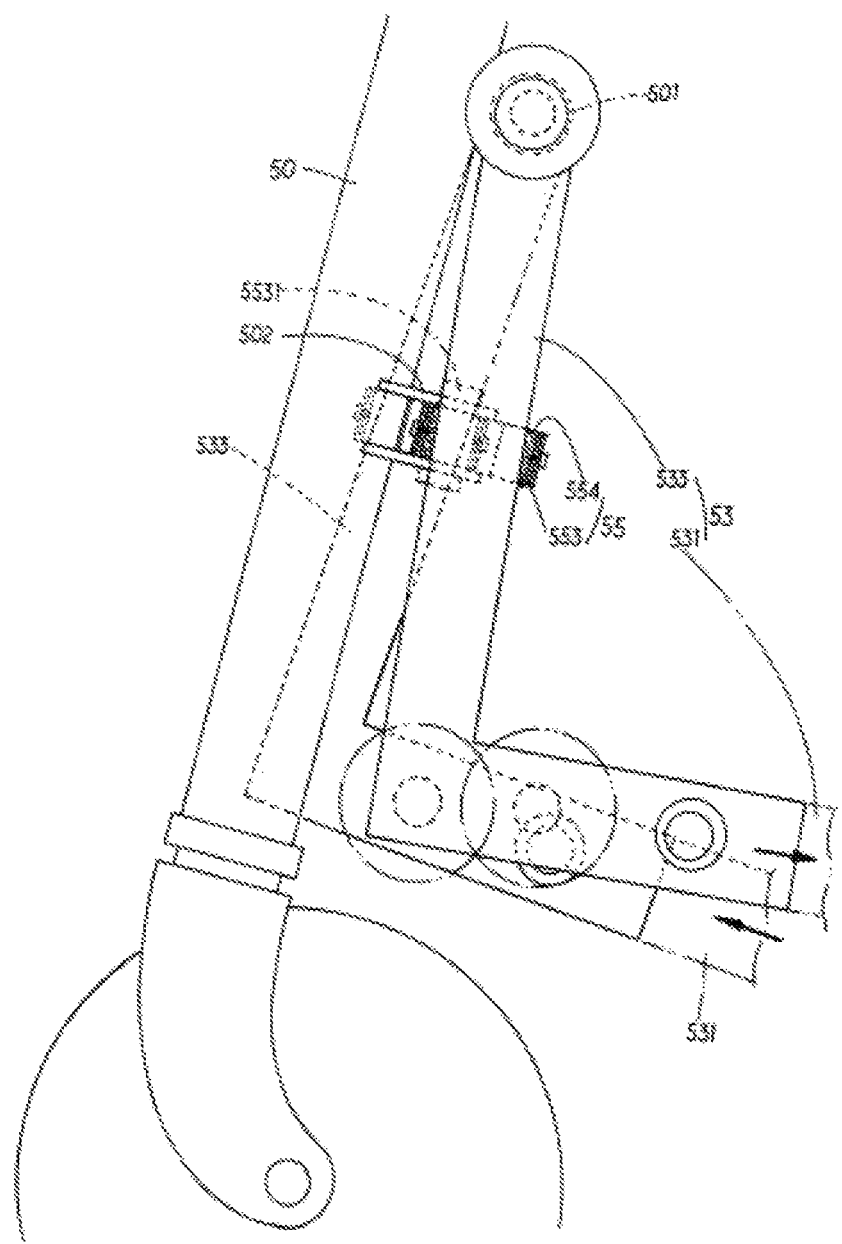
FIG. 13 is a schematic side view of a portion of the structure of FIG. 9 according to a use state.
Figure 14:
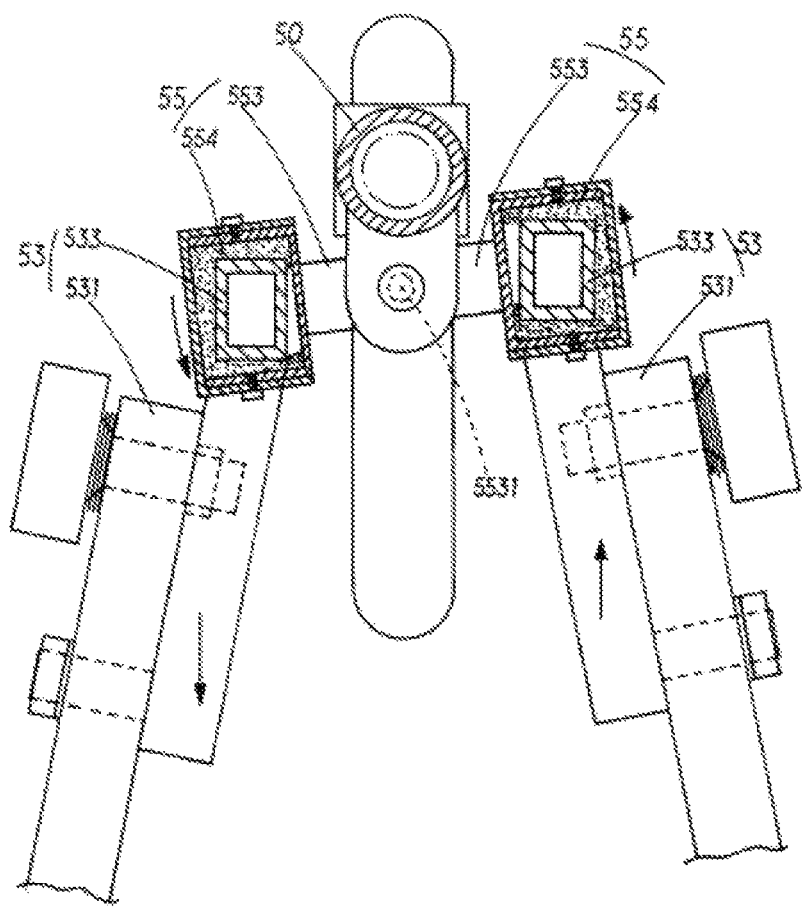
FIG. 14 is a schematic top view of a portion of the structure of FIG. 9 according to a use state.

As shown in FIG. 13 and FIG. 14, for the scooter in the present disclosure employ the above-described structure, and since the holding device 55, which is mounted between the left and right cantilevers 533 arranged on the left and right carriers 53 and the front pipe 50, has the cushioning bodies 554 arranged on out end of the connecting rod 553, which can swing forward and backward, and the cushioning bodies 554 covers the outer circumference of corresponding cantilever 533, thus, when user's feet stand on the left and right carriers 53 and operate the scooter 5 with both hands holding handles 511, the left and right cantilevers 533 is suspended on the front pipe 50 and will be rung alternately forward and backward around the first pivot shaft 501, the connecting rod 553 along with the left and right cantilevers 533 can be swung alternately forward and backward, and through the cushioning bodies 554 arranged on outer side of the cantilevers 533, the connecting rod 553 can provide elastic force limiting, resetting and buffering, leading effections to corresponding cantilever 533, thus make mutual force on the carrier 53 by feet, and that can achieve more comfortable, smooth effections.

Figure 15:
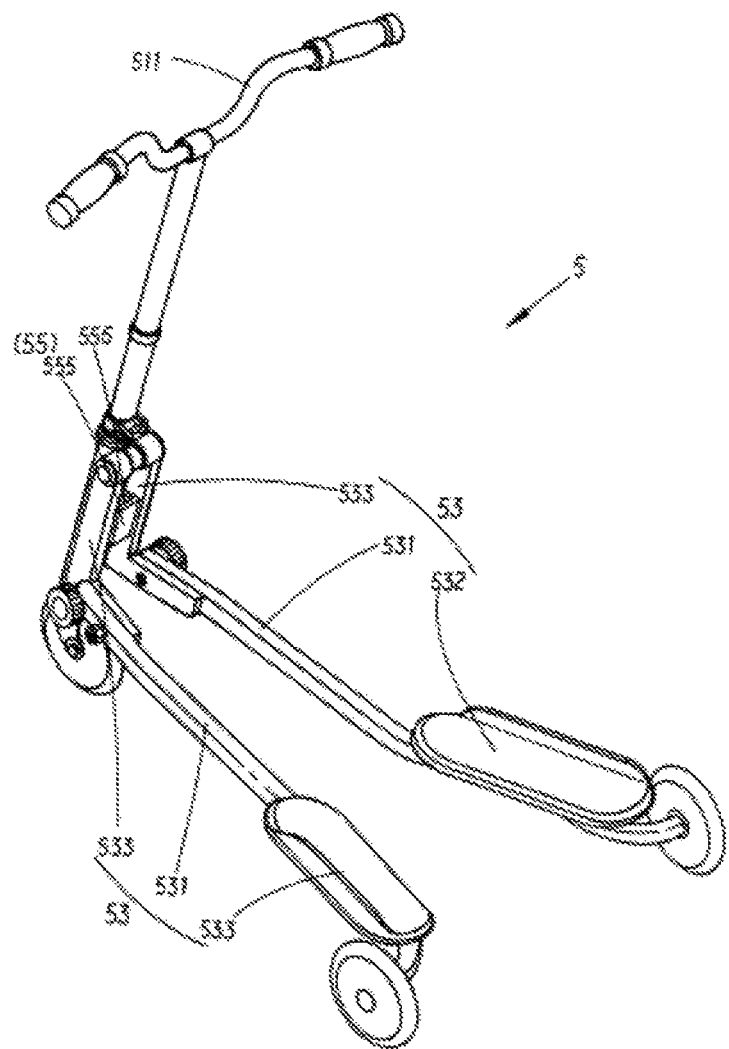
FIG. 15 is a schematic perspective vie of a third embodiment of the present disclosure.
Figure 16:
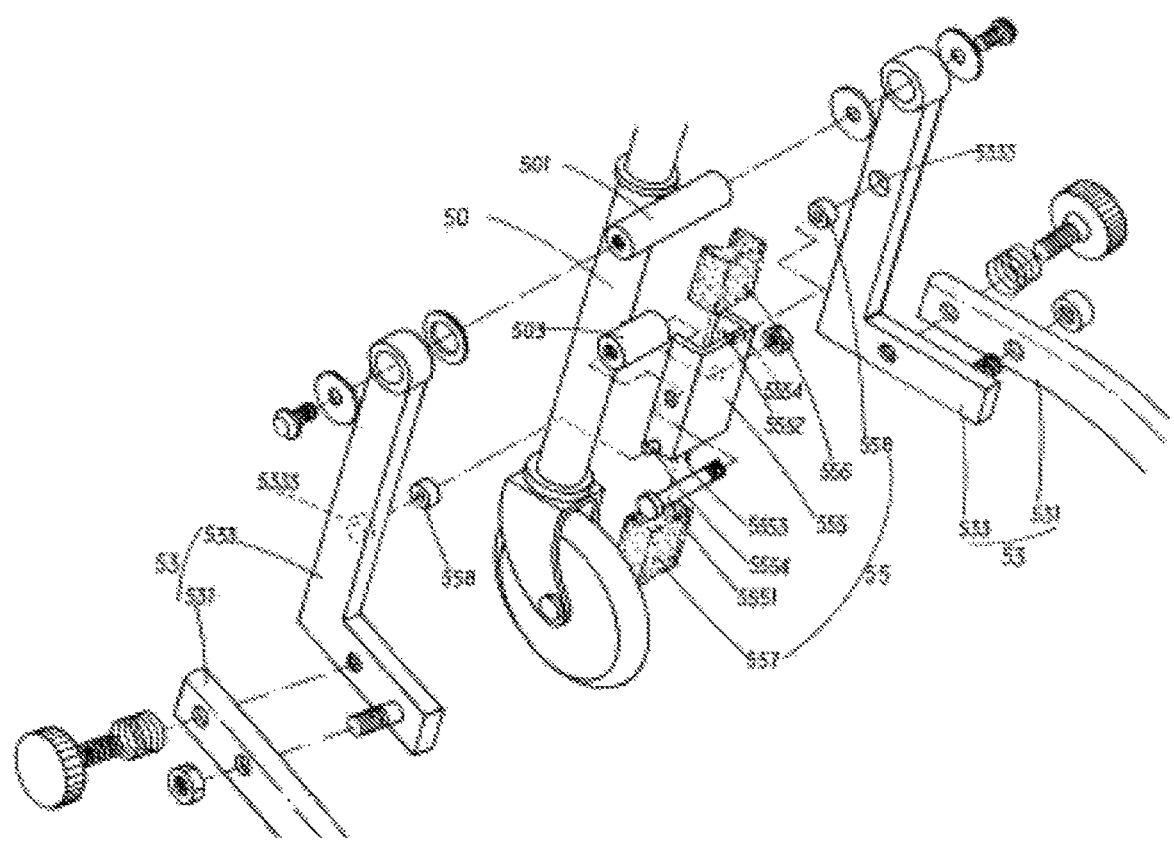
FIG. 16 is an exploded view of a portion of the structure of FIG. 15.
Figure 17:
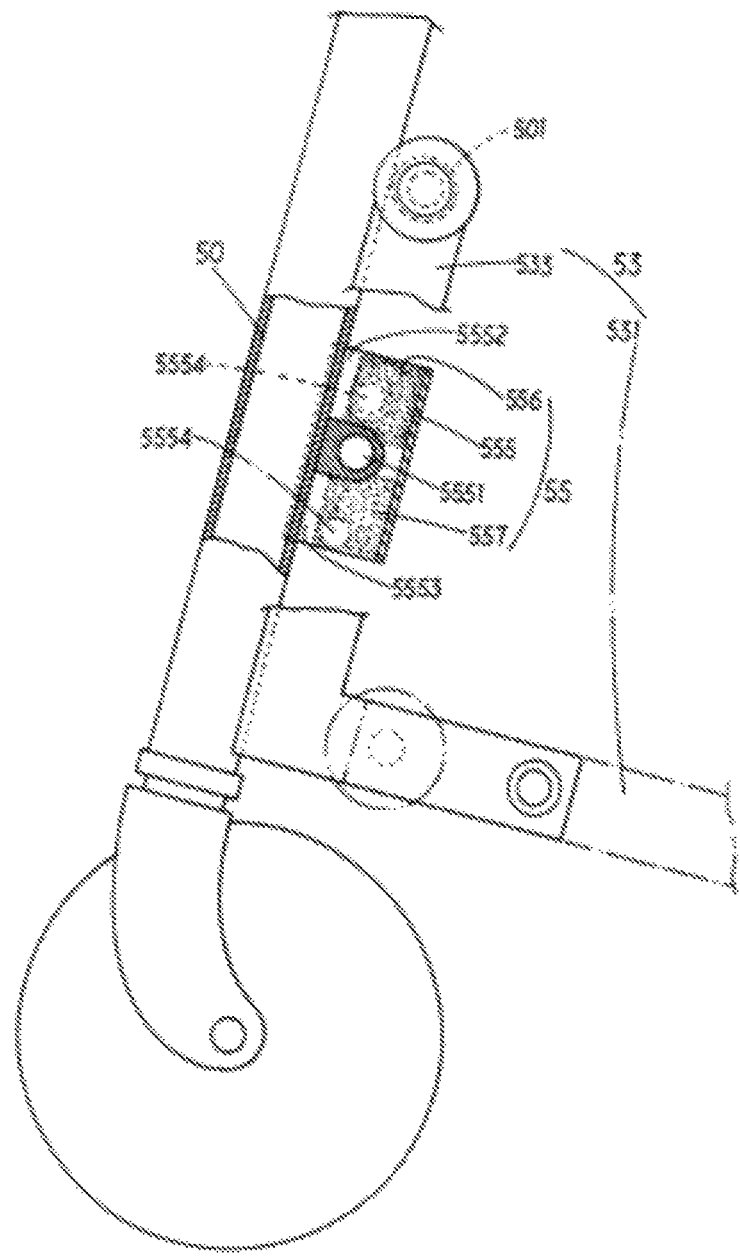
FIG. 17 is a schematic side view of a portion of the structure of FIG. 15.

FIGS. 15 to 17 show a third embodiment of the present disclosure for a scooter. A structure of the scooter 5 in the present embodiment is similar to those of the first embodiment and the second embodiment, and the left and right carriers 53 are respectively mounted on the pivot shaft 501, which is positioned on the front pipe 50, in a suspension form and are free to swing forward and backward through the left and right cantilevers 533. But, the holding device 55, connected between the left and right cantilevers 533 and the front pipe 50, includes a positioning frame 555, a first cushioning body 556, and a second cushioning body 557. The positioning frame 555 is pivoted on a second pivot shaft 503, which is positioned on the front pipe 50, and can swing forward and backward through a pivot 5551, thus the positioning frame 555 is departed into a upper receiving portion 5552 and a lower receiving portion 5553. The first cushioning body 556 and the second cushioning body 557 are respectively received in the upper receiving portion 5552 and the lower receiving portion 5553, and are adjacent to the front pipe 50. Two sides of upper end and lower end of the positioning frame 555 have support shafts 5554 protruding therefrom. Outer ends of right and left support shafts 5554 are respectively inserted on guiding holes 5333 predefined in corresponding one of the left and right cantilevers 533. The guiding holes 5333 have third cushioning bodies 558 passed through by corresponding support shaft 5554.

Figure 18:
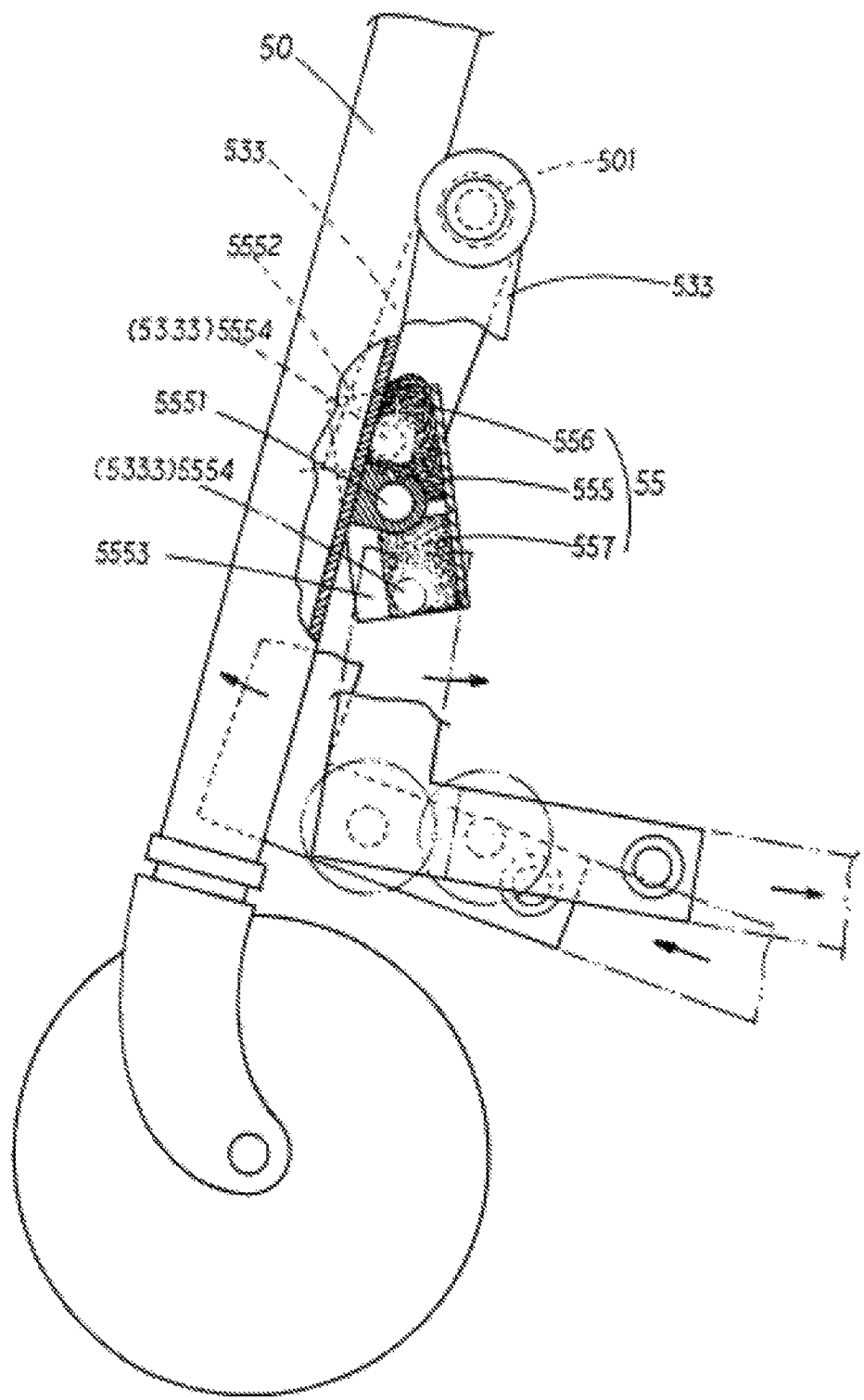
FIG. 18 is a schematic side view (first) of a portion: of the structure of FIG. 15 according to a use state.

As shown in FIG. 18, for the scooter in the present disclosure employ the above-described structure, and since the positioning frame 555 of the holding device 55 is pivoted around the pivot 5551, thus the upper receiving portion 5552 and the lower receiving portion 5553 swing forward and backward. The support shafts 5554 on the upper and lower side of the positioning frame 555 are inserted on guiding holes 5333 defined in the left and right cantilevers 533, thus when user's feet stand on the left and right carriers 53 and operate the scooter 5 with both hands holding handles 511, and the left and right cantilevers 533 suspended on the front pipe 50 will be swung alternately forward and backward around the first pivot shaft 501, the upper and lower ends of the positioning frame 555 can along with the left and right cantilevers 533 to swing forward and backward around the pivot 5551. The first cushioning body 556 and the second cushioning body 557, which are respectively received in the upper receiving portion 5552 and the lower receiving portion 5553, can along with the upper and lower ends of the positioning frame 555 to swing forward and backward, and can be in contact with and pressed on the front pipe 50, which can provide elastic force limiting, resitting and buffering, leading effections to the left and right cantilevers 533, thus make mutual force on the carrier 53 by feet, and that can achieve more comfortable, smooth effections.

Figure 19:
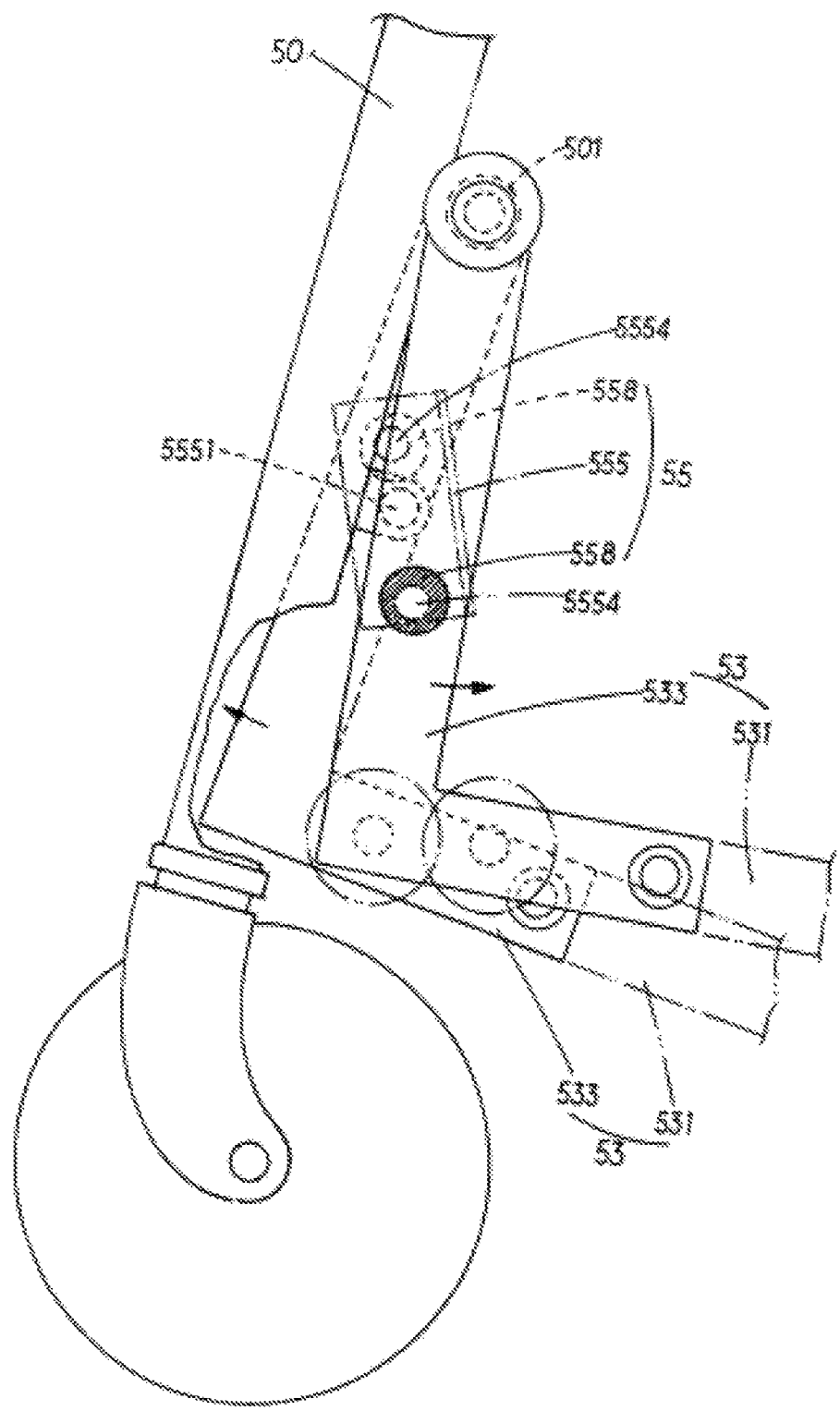
FIG. 19 is a schematic side view (second) of a portion of the structure of FIG. 15 according to a use state.
Figure 20:
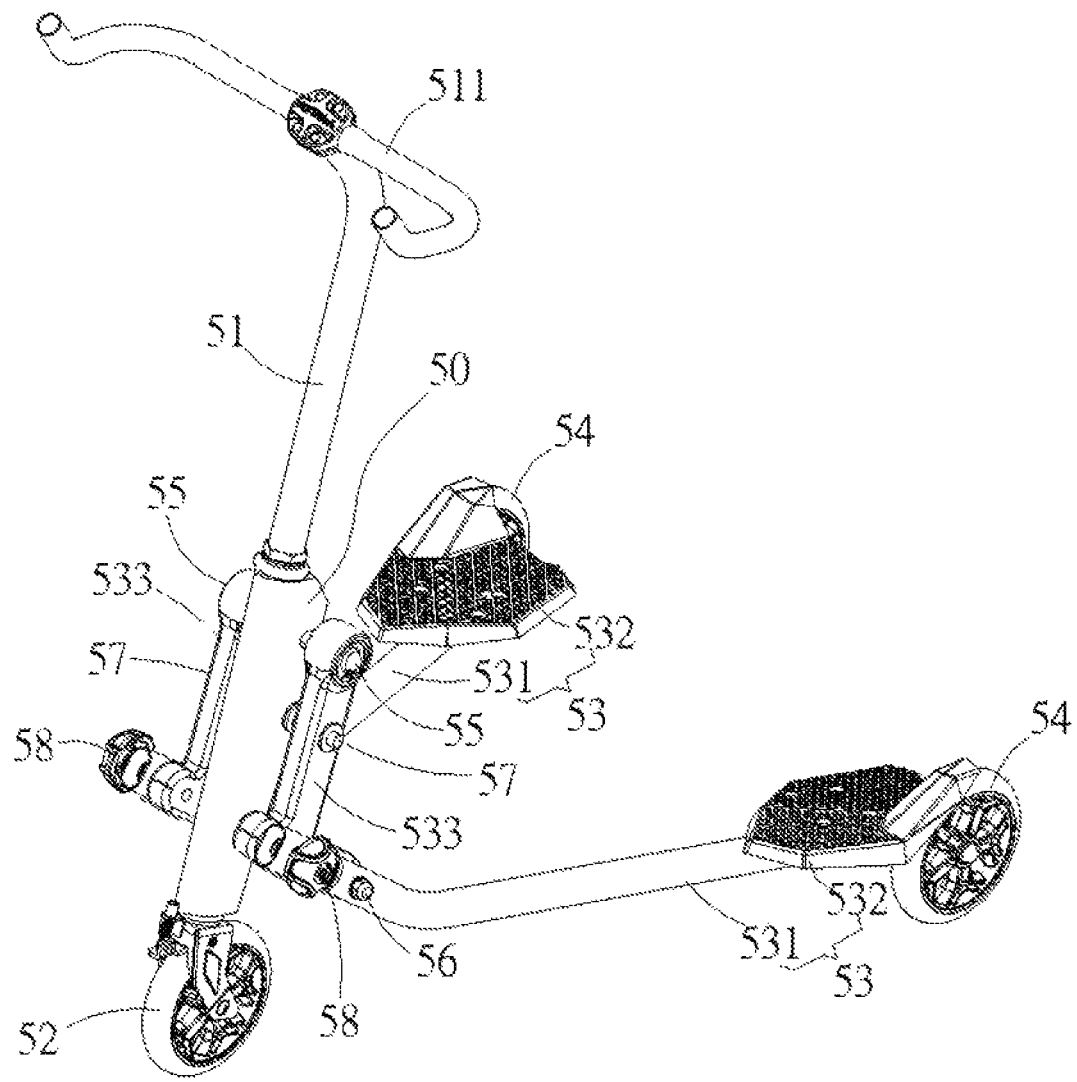
FIG. 20 is a schematic perspective view of a fourth embodiment of the present disclosure.
Figure 21:
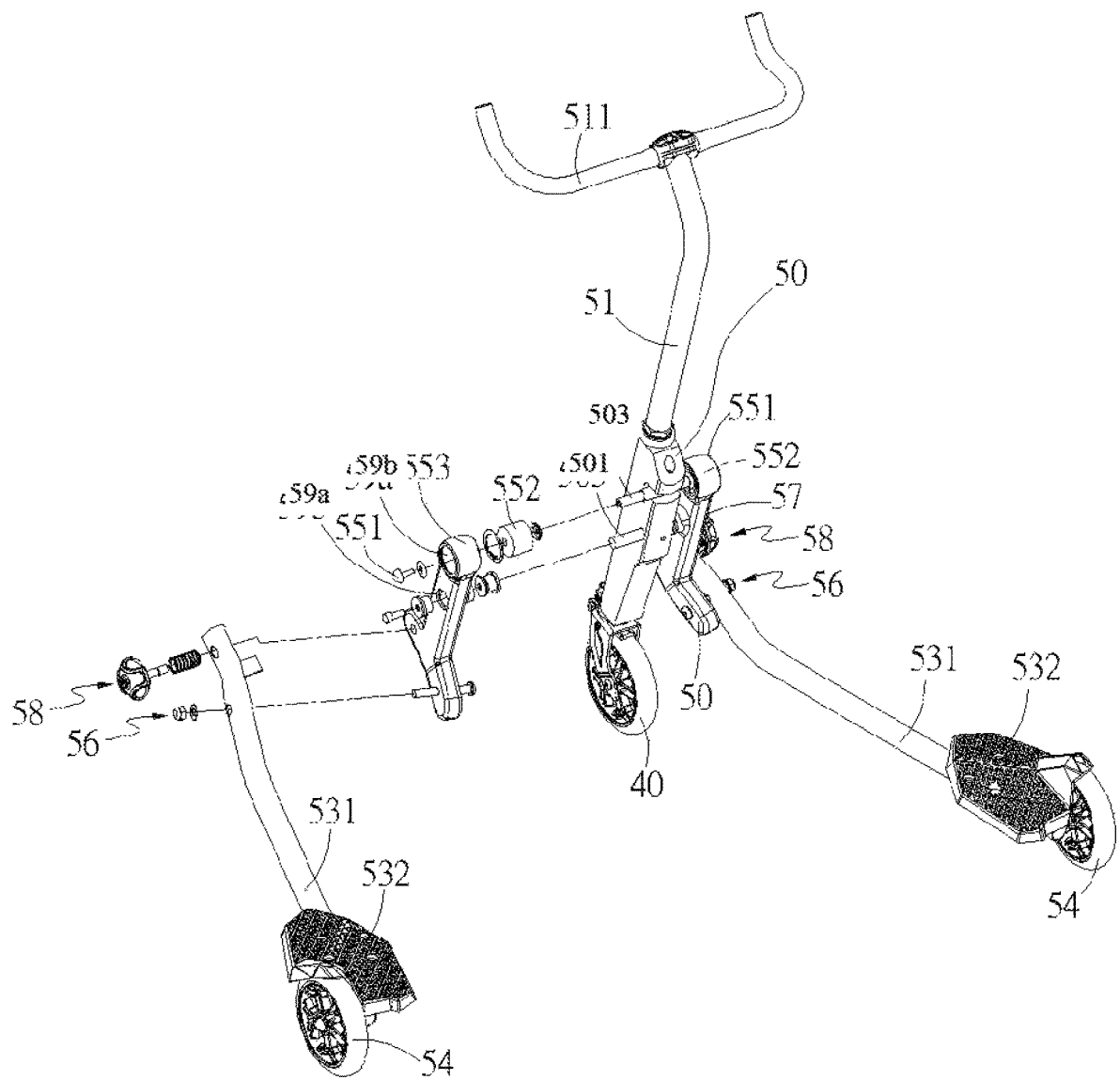
FIG. 21 is an exploded view of a portion of the structure of FIG. 20.
Figure 22:
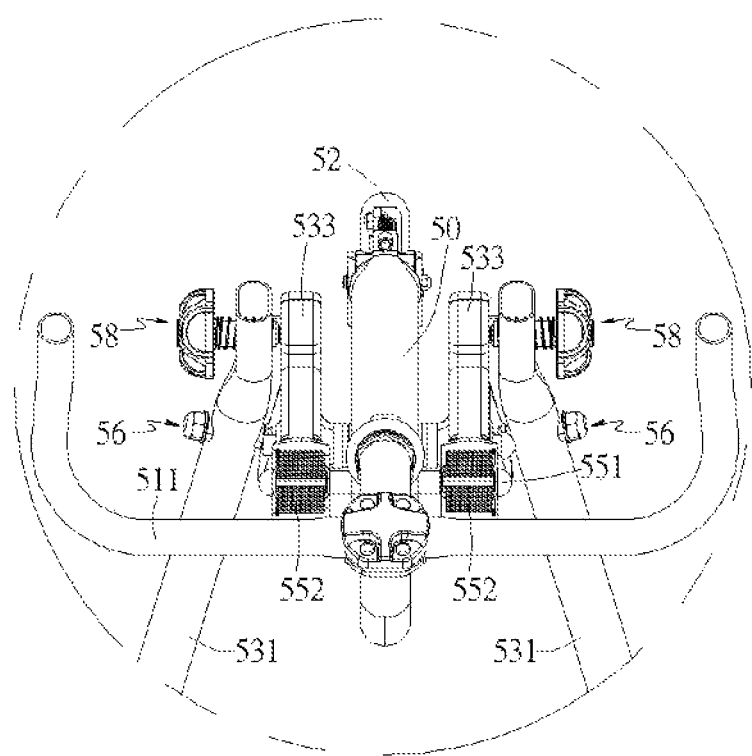
FIG. 22 is a schematic top view of a portion of the structure of FIG. 20.
Figure 23:
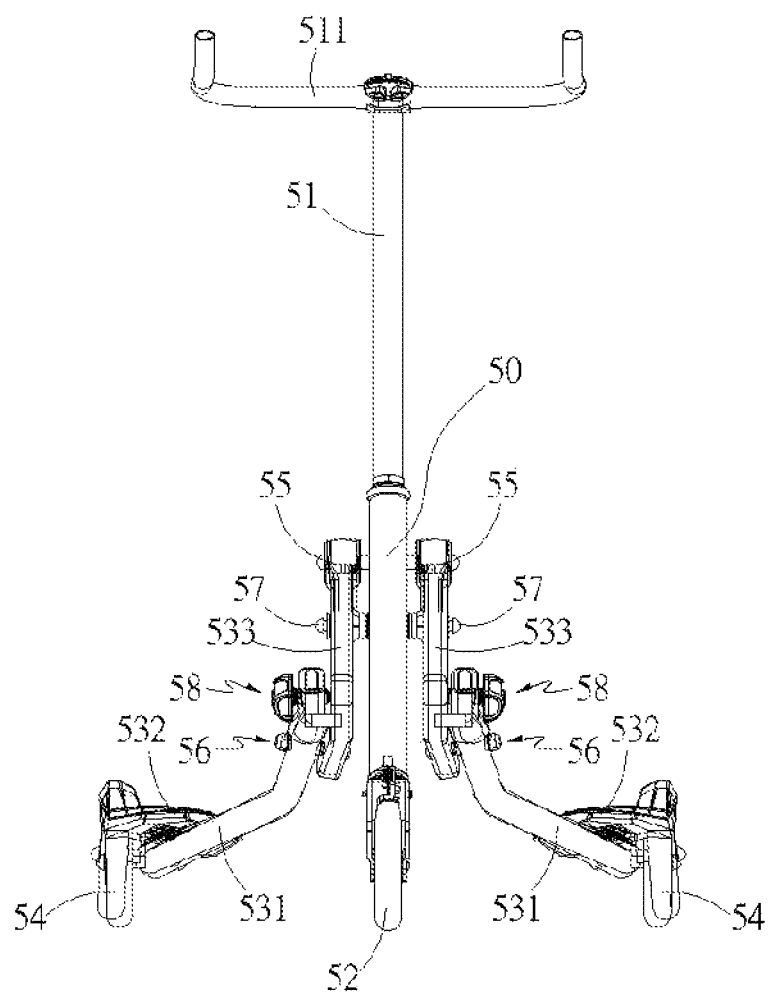
FIG. 23 is a schematic front view of a portion of the stricture of FIG. 20.
Figure 24:
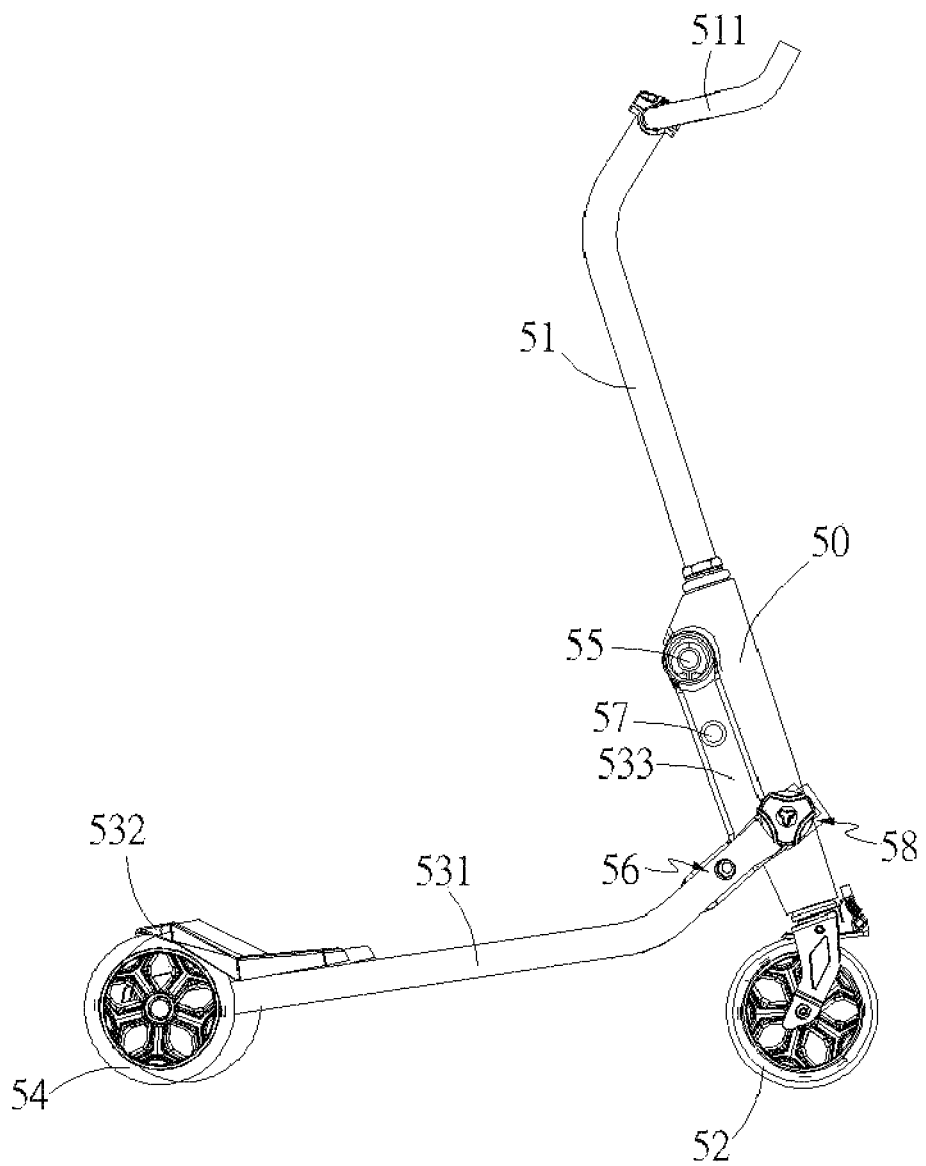
FIG. 24 is a schematic side view of a portion of the structure of FIG. 20.

As shown in FIG. 19, for the guiding holes 5333 of the left and right cantilevers 533 have shaft sleeves corresponding to the third cushioning body 558, thus, when the left and right cantilevers 533 swing alternately forward and backward, the third cushioning body 558 will press on corresponding support shaft 5554 at any time with an elastic force, and then the upper and lower ends of the positioning frame 555 will continuously move without pause, thus the left and right carriers 53 are swung alternately forward and backward, which can achieve more smooth, real and comfortable effections.

FIGS. 20 to 24 show a fourth embodiment of the present disclosure, in this embodiment, the scooter also includes a front pipe 50, a riser 51, handles 511, a front wheel 52, two carriers 53, two rear wheels 54 and the two cantilevers 533. The two carriers 53 are respectively connected to the front pipe 50 through corresponding cantilever 533. And for the left and right cantilevers 533 suspended on two sides of the front pipe 50 and be swung alternately forward and backward, thus the carriers 53 can swung alternately forward and backward, thus the user can use feet to force on the carriers 53, then the carriers 53 alternately displace to cause the scooter body moving forward, and that can improve control performance of the scooter, and, through controlling the scooter 5 move with the handles 511, a movement of the scooter can be more smooth, fast and effectless.

In the fourth embodiment, one end of each cantilever 533 has an holding device 55, another end has a fixing portion 56. Each cantilever 533 has a fixing shaft 57 between the holding device 55 and the fixing portion 56. The cantilevers 533 are connected on left and right sides of the front pipe by both the fixing shaft 57 and the holding device 55. The cantilevers 533 are movable and can swung forward and backward with respect to the front pipe 50 by both the fixing shaft 57 and the holding device 55. Front ends of the carriers 53 are respectively connected to the fixed portions 56 of the cantilevers 533, and the carriers 53 will be swung along to the action of the cantilevers 533. Rear ends of the carriers 53 respectively connect to the rear wheels 54. The scooter is supported by the rear wheels 54 and the front wheel 52 together. Each carrier 53 is integrally formed with corresponding cantilever 533, but are not limited to that.

In the fourth embodiment, each of the left and right sides of the front pipe 50 respectively have a first pivot shaft 501 and a second pivot shaft 503 spaced with each other. Each cantilever 533 defines a first through hole 59a and a second through hole 59b spaced with each other. A distance between the first pivot shaft 501 and the second pivot shaft 503 corresponds to the distance between the first through holes 59a and the second through holes 59b. The holding device 55 further includes a connecting rod 551 and a cushioning body 552. The connecting rod 551 and the cushioning body 552 are inserted on the second through hole 59b. The cushioning body 552 is sleeved on rod body of the connecting rod 551. When the cantilevers 533 are connected to the second pivot shaft 503 connected to front pipe 50 through the connecting rod 551 of the holding device 55, the cushioning body 552 is connected between the connecting rod 551 and the front pipe 50, and the fixing shaft 57 is inserted on the first through hole 59a and connects to the first pivot shaft 501. The connecting rod 551 and the cushioning body 552 can provide a cushioning, resetting, stopping and guiding functions for the cantilevers 533 swung forward and backward, and the carriers 53 can be swung alternately forward and backward.

Thus, the cantilever 533 is movable and can swing forward and backward with respect to the front pipe 50 by both the fixed shaft 57 and the holding device 55, and the carriers 53 can swing forward and backward through the fixed portion 56. And the fixed portion 56 itself can have braking function. The carriers 53 can be swung or fixed relative to the cantilevers 533 through the fixed portion 56.

In the fourth embodiment, a brake device 58 is positioned between front end of the carriers 53 and one end of the cantilever 533 with the fixed portion 56. When the user drives to swing the scooter, the brake device 58 and the fixed portion 56 may further enhance a swinging stability between the carriers 53 and the cantilevers 533. Preferably, the cantilevers 533 in the present disclosure may be substantially inverted T-shaped or L-shaped, the brake device 58 and the fixed portion 56 are located on opposite sides of a same end of the cantilever 533, but the cantilevers 533 are not limited to the inverted T-shaped or L-shaped structure and configuration.

In the present disclosure, the above-described structure is employed. For the cantilever 533 on front end of each carrier 53 is suspended on the front pipe 50 and is swung alternately forward and backward, thus movements of the carriers 53 are remained in forward and backward. The holding device 55, connected between the left and right cantilevers 533 and the front pipe 50, includes a connecting rod 555 and a cushioning body 552, can provide limiting, resetting, buffering and guiding effections. When the user's feet stand on the left and right carriers 53 and the user's hands operate the handles 511, if user alternately presses the right and left hands to swing the handle 511 to swing the riser 51 and the front pipe 50 on left and right, or if user alternately presses the right and the left feet on the left and right carriers 53, or if user twists his body to swing the whole scooter, the left and right cantilevers 533 suspended on the front pipe 50 will be swung alternately forward and backward around the second pivot shaft 503, and that will cause the carriers 53 to replace forward and backward along with the left and right cantilevers 533 and to force on corresponding rear wheels 54, and the two rear wheels 54 can alternately roll forward, and the front wheel 52 will swing on right and left along with the handle 511l and will roll forward along a S-shaped path, to smoothly and fastably drive the scooter to move.

In addition, the fixed end 56 itself may have braking function, and may be swung or fixed relative to the cantilever 533, switchably. Thus, the scooter in the present disclosure can be folded to facilitate handling or collection, and that can mainly be folded between the carriers 53 and the cantilevers 533. The fixed portion 56 is loosen first, and the carriers 53 and the cantilevers 533 rotates through the fixed portion 56, which is facilitate for folding, and the carriers 53 and the cantilevers 533 can be fixed through the fixed portion 56.

Further, another embodiment of the folding between the carriers 53 and the cantilevers 533 may also add a structure of brake device 58. The brake device 58 is released before operation, and the carriers 53 and the cantilevers 533 are rotated through the fixed portion 56, which is facilitate for folding, and the carriers 53 and the cantilevers 533 can be fixed through the fixed portion 56.

While the embodiments of the present disclosure have been shown and described, it will be understood by those of ordinary skill in the art that various embodiments may be made without departing from the principles and spirit of the present disclosure equivalents of variations, modifications, substitutions, and variations of the present disclosure are defined by the appended claims and their equivalents.

What is claimed is:

1. A scooter, comprising:
front pipe having a longitudinal axis;
riser, free rotatably pivoted on the front pipe, handles being arranged on upper end of the riser;
front wheel, arranged on lower end of the riser;
left and right carriers, connected to the front pipe;
left and right rear wheels, respectively mounted on the left and right carriers, to support the scooter with the front wheel;
wherein cantilevers are respectively positioned on the left and right carriers, and the left and right cantilevers are mounted on the front pipe in a suspension form and are free to swing forward and backward, the left and right cantilevers and the front pipe are connected with each other by a holding device, which provide the left and right carriers to swing forward and backward and to displace; and
wherein each of the left and right cantilevers is pivotable with respect to a first axis perpendicular to the longitudinal axis of the front pipe, and the holding device is pivotable with respect to a second axis parallel to the longitudinal axis of the front pipe.

2. The scooter as claimed in claim 1, wherein the holding device comprises a connecting rod, and left and right cushioning bodies, the connecting rod is pivoted on the front pipe and is swung forward and backward, the left and right cushioning bodies are positioned on corresponding cantilever and are passed through by outer end of the connecting rod.

3. The scooter as claimed in claim 2, wherein the connecting rod of the holding device is provided as a single one, a middle portion is pivoted on the front pipe by a pivot, two ends of the connecting rod are respectively inserted on the cushioning bodies of corresponding cantilevers; or, the connecting rod of the holding device is provided as a left connecting rod and a right connecting rod, inner end of each connecting rod is pivoted on the front pipe by a pivot, outer end of each connecting rod is respectively inserted on the cushion body of corresponding cantilever.

4. The scooter as claimed in claim 1, wherein the holding device comprises a connecting rod, and left and right cushioning bodies, the connecting rod is pivoted on the front pipe and is swung forward and backward, the left and right cushioning bodies respectively cover outer circumference of corresponding cantilever and are respectively fixed by outer end of the connecting rod.

5. The scooter as claimed in claim 4, wherein the connecting rod of the holding device is provided as a single one, a middle portion is pivoted on the front pipe by a pivot, two ends of the connecting rod have buckle ears, the buckle ears positions the cushioning body covering outer circumference of the cantilevers by locking components; or, the connecting rod of the holding device is provided as a left connecting rod and a right connecting rod, inner end of each connecting rod is pivoted on the front pipe by a pivot, outer end of each connecting rod has buckle ears, the buckle ears respectively positions the cushioning body covering outer circumference of the cantilevers by locking components.

6. The scooter as claimed in claim 1, wherein the holding device comprises a positioning frame, a first cushioning body, and a second cushioning body, the positioning frame is pivoted on the front pipe 50 and is swung forward and backward, the positioning frame is departed into a upper receiving portion and a lower receiving portion; the first cushioning body and the second cushioning body are respectively received in the upper receiving portion and the lower receiving portion, and are adjacent to the front pipe; two sides of upper end and lower end of the positioning frame have protruding support shafts, outer ends of right and left support shafts are respectively inserted on guiding holes predefined in corresponding one of the left and right cantilevers.

7. The scooter as claimed in claim 6, wherein the guiding holes have third cushioning bodies and are passed through by corresponding support shaft.

8. The scooter as claimed in claim 1, wherein one end of each cantilever has an holding device, another end of each cantilever has a fixing portion, each cantilever has a fixing shaft between the holding device and the fixing portion, the cantilevers are connected on left and right sides of the front pipe by both the fixing shaft and the holding device, the left and right cantilevers are movable and are swung forward and backward with respect to the front pipe by both the fixing shaft and the holding device, front ends of the carriers are respectively connected to the fixed portions of the cantilevers.

9. The scooter as claimed in claim 8, wherein the holding device comprises a connecting rod and a cushioning body, the connecting rod connects the cantilevers and the front pipe, when the connection rod connecting the front pipe, the cushioning body is connected between the connecting rod and the front pipe.

10. The scooter as claimed in claim 9, wherein the cushioning body is spring or gifted rubber.

11. The scooter as claimed in claim 9, wherein each of the left and right sides of the front pipe respectively have a first pivot shaft, each of the left and right cantilevers defines a first through hole, the fixing shaft is inserted on the first through hole and connects to the first pivot shaft.

12. The scooter as claimed in claim 11, wherein each of the left and right sides of the front pipe further respectively have a second pivot shaft spaced from the first pivot shaft, each of the left and right cantilevers further defines a second through hole spaced from the first through hole, the connecting rod and the cushioning body are inserted on the second through hole, the shaft of the connecting rod is connected to the second pivot shaft.

13. The scooter as claimed in claim 8, wherein the fixing portion is as a brake device positioned between front end of the carriers and front end of the cantilever, the carriers are swung or fixed through the fixed portion with respect to the cantilever.

14. The scooter as claimed in claim 1, wherein the holding device is cushioning elastic body or flexible body, one end of the cushioning elastic body or the flexible body is positioned on the front pipe and the other end of the cushioning elastic body or the flexible body is positioned on corresponding one of the left and right cantilevers.

15. The scooter as claimed in claim 1, wherein the cushioning elastic body or flexible body is spring or gifted rubber.

16. The scooter as claimed in claim 1, wherein a brake device is positioned between front end of the carriers and one end of the cantilever with the fixed portion, the carriers are swung or fixed through the brake device with respect to the cantilever.

17. The scooter as claimed in claim 16, wherein the cantilevers are substantially inverted T-shaped or L-shaped, the brake device and the fixed portion are located on opposite sides of a same end of the cantilever.

18. The scooter as claimed in claim 1, wherein each of the left and right carriers comprises a carrier rod and a pedal.

19. The scooter as claimed in claim 1, wherein front ends of left and right carriers are integrated with corresponding cantilevers.

20. The scooter as claimed in claim 1, wherein a first pivot shaft is arranged on the front pipe, sleeves are respectively arranged on the cantilevers of the left and right carriers, the first pivot shaft is passing through the sleeves.

\* \* \* \* \*